US008522930B1

(12) United States Patent
Preston et al.

(10) Patent No.: US 8,522,930 B1
(45) Date of Patent: Sep. 3, 2013

(54) CLAMPING ASSEMBLY EMPLOYING A SHAPE MEMORY ALLOY ACTUATING APPARATUS

(75) Inventors: Steve Preston, Winter Springs, FL (US);
David A. Huyett, Casselberry, FL (US);
Robert A. Holton, Orlando, FL (US)

(73) Assignee: Lockheed Martin Corporation, Orlando, FL (US)

( * ) Notice: Subject to any disclaimer, the term of this patent is extended or adjusted under 35 U.S.C. 154(b) by 162 days.

(21) Appl. No.: 13/205,211

(22) Filed: Aug. 8, 2011

(51) Int. Cl.
*B60T 13/74* (2006.01)
*F16D 49/08* (2006.01)

(52) U.S. Cl.
USPC .............. 188/158; 188/28; 188/68; 188/72.1; 188/75

(58) Field of Classification Search
USPC .............. 188/28, 31, 68, 69, 71.1, 72.1, 73.1, 188/75, 158
See application file for complete search history.

(56) References Cited

U.S. PATENT DOCUMENTS

| 4,846,573 | A | * | 7/1989 | Taylor et al. ................ 356/241.4 |
| 4,965,545 | A | * | 10/1990 | Johnson ......................... 337/140 |
| 5,377,802 | A | | 1/1995 | Ide |
| 6,902,048 | B1 | | 6/2005 | Chung |
| 7,037,076 | B2 | | 5/2006 | Jacot et al. |
| 7,093,817 | B2 | | 8/2006 | MacGregor et al. |
| 7,712,403 | B2 | | 5/2010 | Gass et al. |
| 2004/0231950 | A1 | * | 11/2004 | Butera et al. ............... 192/116.5 |
| 2008/0141736 | A1 | * | 6/2008 | Jones et al. ......................... 70/77 |
| 2010/0018823 | A1 | * | 1/2010 | Melz et al. ....................... 192/40 |

FOREIGN PATENT DOCUMENTS

| JP | 58211027 A | * | 12/1983 |
| JP | 63285339 A | * | 11/1988 |
| JP | 03037433 A | * | 2/1991 |

OTHER PUBLICATIONS (Mechanical Engineering Seniors, Graduated in Aug. 2008; Mechanical Engineering Faculty) Elastic Regenerative Braking System based on Superelastic Shape Memory Material: A Research focused ME Capstone Design Project, 2008.

* cited by examiner

*Primary Examiner* — Thomas J Williams
(74) *Attorney, Agent, or Firm* — Roetzel & Andress; Jason S. Miller

(57) ABSTRACT

The present disclosure relates to a miniature precision clamping assembly driven by a shape memory alloy actuator wire (SMA wire) which may be employed within a braking or clutch system. The clamping assembly includes a first clamping element, a second clamping element and an SMA wire connected to the first and second clamping elements by being interwoven through a plurality of pressure amplifiers located on the exterior surfaces of the first and second clamping elements. Both the first and second clamping elements are configured to be positioned about a rotatable shaft and move in translation to the shaft via a transition action of the SMA wire between a clamping and releasing position. By energizing the SMA wire a contracting or compressing action is generated thereby causing the first and second clamping elements to move into engagement with the one shaft for inhibiting rotational movement.

20 Claims, 3 Drawing Sheets

CLAMPING ASSEMBLY EMPLOYING A SHAPE MEMORY ALLOY ACTUATING APPARATUS

FIELD OF DISCLOSURE

The present disclosure generally relates to the field of braking and clutch systems and methods, and in particular, to a clamping assembly employing shape memory alloys operable for actuating a clamping sequence within a braking and clutch.

BACKGROUND

Braking and clutch systems are used in a wide variety of applications. Typically, a braking system will include a rotatable shaft having a first clamping element rotationally connected to the shaft and a second clamping element connect to the shaft. A mechanical or electromechanical actuator system or other device may be provided for controlling the translational movement of the first and second clamping elements between a clamping position and a releasable position. Upon actuation, the first and second clamping elements are moved into engagement with the shaft causing a braking effect or otherwise inhibiting continued rotational movement of the shaft. In regard to a clutch system, conventional apparatus typically include two rotating shafts, wherein one shaft is attached to a motor or other power unit (the driving member) while the other shaft (the driven member) provides output power for work to be done. Attached to each of the shafts is a clutch plate operable for connection to the other. In response to a compressive force from a mechanical or electromechanical actuator system or other device, the clutch plates engage each other thereby connecting the two shafts so that they may be locked together and spin at the same speed (engaged), locked together but spinning at different speeds (slipping), or unlocked and spinning at different speeds (disengaged).

Oftentimes, existing braking and clutch systems are too large and complex in design for the desired application. For certain applications, braking and clutch systems are required to be miniaturized and in some cases to work on non-ferrous shafts. Examples of industries that demand novel, miniature, and powerful braking or clutch systems are medicine, biotechnology, information technology, space, manufacturing, entertainment, military, and micro- and nanotechnology. Conventionally, hydraulic, pneumatic, or magnetic braking or clutch systems have been used. Unfortunately, each of these types of systems has shortcomings for the desired applications. Hydraulic systems work well in larger environments but for small or confined applications, the use of the pressurized materials, seals, transfer chambers etc. all undesirably add complexity and size to the application. Further and for similar reasons, pneumatic and magnetic systems can become large, expensive and complex based upon the desired application. Moreover, magnetic systems typically rely on a ferrous material for the shaft to be halted.

In specific regard to the actuator systems of known braking or clutch systems, increasingly the actuators used are also required to be reduced in size, mass, power consumption, and cost. Conventional actuators such as DC motors, pneumatic motors, and hydraulic motors are energy-wasting, large volume, and heavy-mass actuation systems.

SUMMARY OF THE DISCLOSURE

The present disclosure is designed to overcome the deficiencies and shortcomings of the devices and systems conventionally known and described above. The present disclosure is designed to reduce the size, manufacturing costs and the complexity of braking and clutch systems. In all example embodiments, the present disclosure relates to a miniature precision clamping assembly driven by a shape memory alloy actuator wire (SMA wire) which may be employed within a braking or clutch system.

In one example embodiment, a braking system is provided and includes a rotatable shaft connected to and driven by a motor and a clamping assembly positioned about the rotatable shaft and being operable for engaging the shaft and inhibiting rotational movement. The clamping assembly includes a first clamping element or brake pad rotationally connected about the shaft, a second clamping element or brake pad rotationally connected about the shaft and positioned adjacent the first clamping element, and an SMA wire connected to the first and second clamping elements by being interwoven through a plurality of pressure amplifiers located on the exterior surfaces of the first and second clamping elements. Both the first and second clamping elements are configured to move in translation to the shaft via a transition action of the SMA wire between a clamping and releasing position. By energizing the SMA wire (adding an electrical current thereto) a contracting action is generated thereby causing the first and second clamping elements to move into engagement with the shaft for braking. The braking amount may be actively controlled by the amount of electrical current introduced to the SMA wire.

In another example embodiment, a clutch system is provided and includes first and second rotating shafts. The first shaft is attached to and driven by a motor or other power unit (the driving member) while the second shaft (the driven member) provides output power for work to be done. Each of the first and second shafts are provided with a primary clutch plate at their distal end. A clamping assembly is disposed in the clutch system and includes a pair of non-rotating secondary clamping elements or clutch plates. The secondary clutch plates are provided about each shaft and are positioned parallel to and adjacent the primary clutch plates. Further, the secondary clutch plates are connected to each other via an SMA wire which is interwoven through a plurality of pressure amplifiers located on the exterior surfaces of each secondary plate. Upon receipt of an electrical current, the SMA wire contracts thereby compressing the secondary clutch pates together and causing the primary clutch plates to come into contact so that they may be locked together and spin at the same speed (engaged) or locked together but spinning at different speeds (slipping).

In still other example embodiments, the clamping assembly may include a biasing mechanism or spring positioned between the first and second clamping elements of the braking system or between the non-rotating secondary clutch plates of the clutch system. Subsequent to a contracting action by the SMA wire, the biasing mechanism may expand as the SMA wire transitions in phase, thereby assisting in the disengagement of the clamping elements or clutch plates.

Additional features and advantages of the disclosure will be set forth in the detailed description which follows, and in part will be readily apparent to those skilled in the art from that description or recognized by practicing the disclosure as described herein, including the detailed description which follows, the claims, as well as the appended drawings.

It is to be understood that both the foregoing general description and the following detailed description present example embodiments of the disclosure, and are intended to provide an overview or framework for understanding the nature and character of the disclosure as it is claimed. The accompanying drawings are included to provide a further understanding of the disclosure, and are incorporated into and constitute a part of this specification. The drawings illustrate various embodiments of the disclosure, and together with the detailed description, serve to explain the principles and operations thereof.

BRIEF DESCRIPTION OF THE DRAWINGS

The present subject matter may take form in various components and arrangements of components, and in various steps and arrangements of steps. The appended drawings are only for purposes of illustrating example embodiments and are not to be construed as limiting the subject matter.

DETAILED DESCRIPTION

The present disclosure will now be described more fully hereinafter with reference to the accompanying drawings in which example embodiments of the disclosure are shown. However, this disclosure may be embodied in many different forms and should not be construed as limited to the embodiments set forth herein. These example embodiments are provided so that this disclosure will be both thorough and complete, and will fully convey the scope of the disclosure to those skilled in the art. Like reference numbers refer to like elements throughout the various drawings. Further, as used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise.

In all example embodiments, the present disclosure relates to a miniature precision clamping assembly employing a shape memory alloy actuator wire (SMA wire) for actuating the clamping sequence and being operable for use with a braking or clutch system. Shape memory alloys belong to a class of materials that undergo a temperature induced phase transition with an associated significant dimensional change. During this dimensional change, shape memory alloys can exert a significant force and can thus serve as effective actuators in certain systems. The clamping assembly's use of the SMA wire provides greater energy efficiency than that of conventional mechanical or electromechanical actuators and provides a greater force to mass ratio. Additionally, the cost of shape memory alloy materials compares favorably to the cost of hydraulic or magnetic devices with similar capabilities. Advantages of using an SMA wire also include the relatively small size of an actuator wire, the ease of use, the low power consumption, and the ability to create a braking or clutch system in a condensed or confined space.

Figure 1:
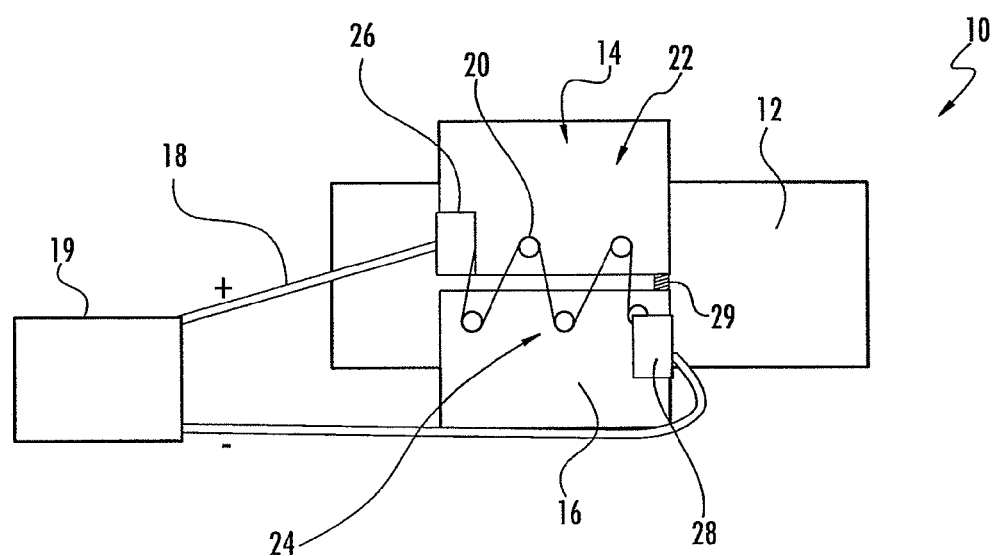
FIG. 1 is a schematic view of a braking system employing the clamping assembly according to one example embodiment of the present disclosure.
Figure 2:
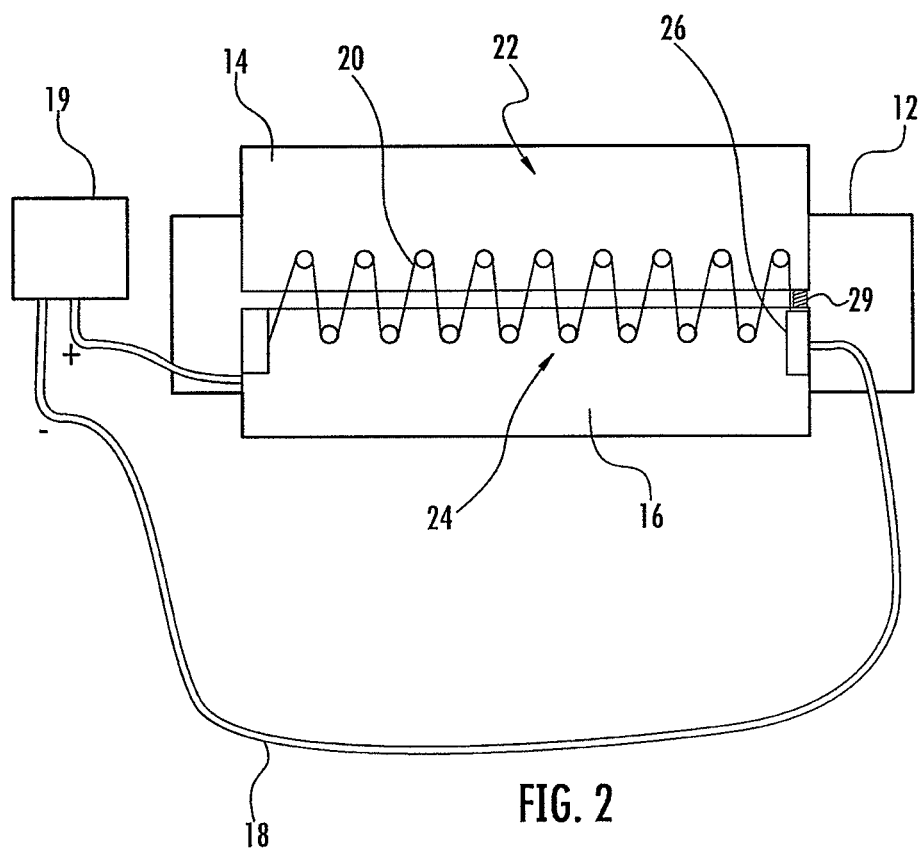
FIG. 2 is a schematic view of a braking system employing the clamping assembly according to another example embodiment of the present disclosure.

In an example embodiment, a braking system is provided and shown in FIGS. 1-2. The braking system 10 generally includes a rotatable shaft 12 connected to and driven by a motor (not shown) and a clamping assembly positioned about the shaft 12. The clamping assembly includes a first clamping element or brake pad 14 rotationally connected about the shaft 12, a second clamping element or brake pad 16 rotationally connect about the shaft 12 and positioned adjacent the first clamping element 14, and an SMA wire 18 connected to the clamping elements 14, 16. Both the first and second clamping elements 14, 16 may be movably connected to each other and are configured to move in translation to the shaft 12 via a transition action of the SMA wire 18 between a clamping and releasing position. By energizing the SMA wire, a contracting action is generated causing a clamping sequence whereby the first and second clamping elements 14, 16 to move into engagement with the shaft 12 for braking or otherwise inhibiting rotational movement.

In example embodiments, the SMA wire is operable for providing a movement to release a force and is comprised of an SMA material, such as a nickel-titanium alloy material, sometimes referred to as "Nitinol." Other suitable alloys may be CuAlNi or TiNiPd. One example of a type of SMA wire suitable for use in conjunction with present disclosure is a Nitinol wire marketed by and available from Dynalloy, Inc. under the trade name Flexinol® may be used. By way of example only, a Flexinol® wire having a diameter of approximately 0.01-inch and a resistance of 0.5-ohms per inch could provide approximately 930 grams of pull force, with an approximate current of 1000 milliamps and with a contraction of 4% of length over 1 second, where the contraction time is related to current input. Regardless, the SMA wire 18 of the present disclosure is designed to contract in a manner which pulls together the clamping elements 14, 16. Further, the SMA wire 18 is designed to be self regulating as the entire wire decreases or contracts in size identically along the entire wire segment so that equal pressure is insured.

One skilled in the art will appreciate that the SMA material is sensitive to temperature or heat. For example, the material temporarily decreases in size or contracts at a certain temperature, or shrinkage temperature, such as about 70° C. above ambient temperature for Nitinol, and expands at a relatively lower temperature to return to its original condition. In response to being heated to the above-described shrinkage temperature, the SMA undergoes a dimensional change, such as a change in its length. In this way, a wire composed of a material such as Nitinol, can undergo a change in length and a return toward its original length one or more times via temperature treatment or repeated temperature cycling. It is will be understood by those skilled in the art and it is contemplated that any material that expands by going through a phase transition at a certain temperature and shrinks at a different temperature to return toward its original condition could be used for the SMA wire 18.

In the process of undergoing a dimensional change, as described above, the SMA material goes through a reversible phase transition or transformation, or a reversible structural phase transition, upon a change in temperature. Generally, such a transition represents a change in the material from one solid phase of the material to another, for example, by virtue of a change in the crystal structure of the material or by virtue of a reordering of the material at a molecular level. In the case of Nitinol, for example, the superelastic alloy has a low temperature phase, or martensitic phase, and a high temperature phase, or austenitic phase. These phases can also be referred to in terms of a stiff phase and a soft and malleable phase, or responsive phase. The particular phase transition associated with a particular alloy material may vary. However, it will be understood by those skilled in the art that any SMA wire may be used which exhibits a contraction of between 4% and 8% between its martensite and austenite phases.

Referring back to FIGS. 1-2, the SMA wire 18 is connected to firing circuit 19 (which constitutes an energy source of electricity). The SMA wire 18 is interwoven through a plurality of pressure amplifiers 20 located on the exterior surfaces 22, 24 of the first and second clamping elements 14, 16. One skilled in the art will appreciate that in an alternate embodiment, there could be two sets of pressure amplifiers 20 and two SMA wires 18 which may be activated simultaneously. In example embodiments, the pressure amplifiers 20 are configured about the exterior surfaces 22, 24 such that the SMA wire 18 is interwoven in a manner which does not exceed the minimum bending radius. It will be understood by those skilled in the art that the term "minimum bending radius" as used herein means the minimum radius within which an SMA wire 18 can be bent and still be capable of repeated austenite-martensite cycling without damage. Mounted on each of the clamping elements 14, 16 is a fastener 26, 28 for securing the SMA wire 18 to the clamping elements 14, 16. When energy (an electric current) is supplied from the firing circuit through SMA wire 18, the resistance of the wire heats the wire and causes the wire to contract, which pulls the first and second clamping elements 14, 16 together, thereby causing them to engage the rotating shaft 12. The frictional forces of the clamping elements 14, 16 against the shaft 12 causes a braking or clamping effect or otherwise inhibits continued rotational movement of the shaft 12.

Advantageously, the contracting action of the SMA wire 18 is consistent along the entire length of the wire, thus no one wire segment is required to contribute more pressure or force than another. Therefore, increase braking or clamping pressure is easily provided by simply weaving the SMA wire 18 between the clamping elements 14, 16 more for more pressure. More specifically and as best shown in FIG. 2, by increasing the overall length of the clamping elements 14, 16 and adding additional pressure amplifiers 20, an increased braking or clamping pressure may be provided by weaving the SMA wire 18 through the added pressure amplifiers 20. As the SMA wire 18 is energized by an electric current, the SMA wire 18 contracts equally across its entire length thereby providing an increased compressive force to the clamping elements 14, 16 against the shaft 12. Conversely, decreasing braking or clamping pressure is easily provided by removing pressure amplifiers 20 and decreasing the number of weaves to the clamping elements 14, 16. Further, the braking amount may advantageously be actively controlled by the amount of electrical current introduced from the firing circuit to the SMA wire 18.

Figure 3:
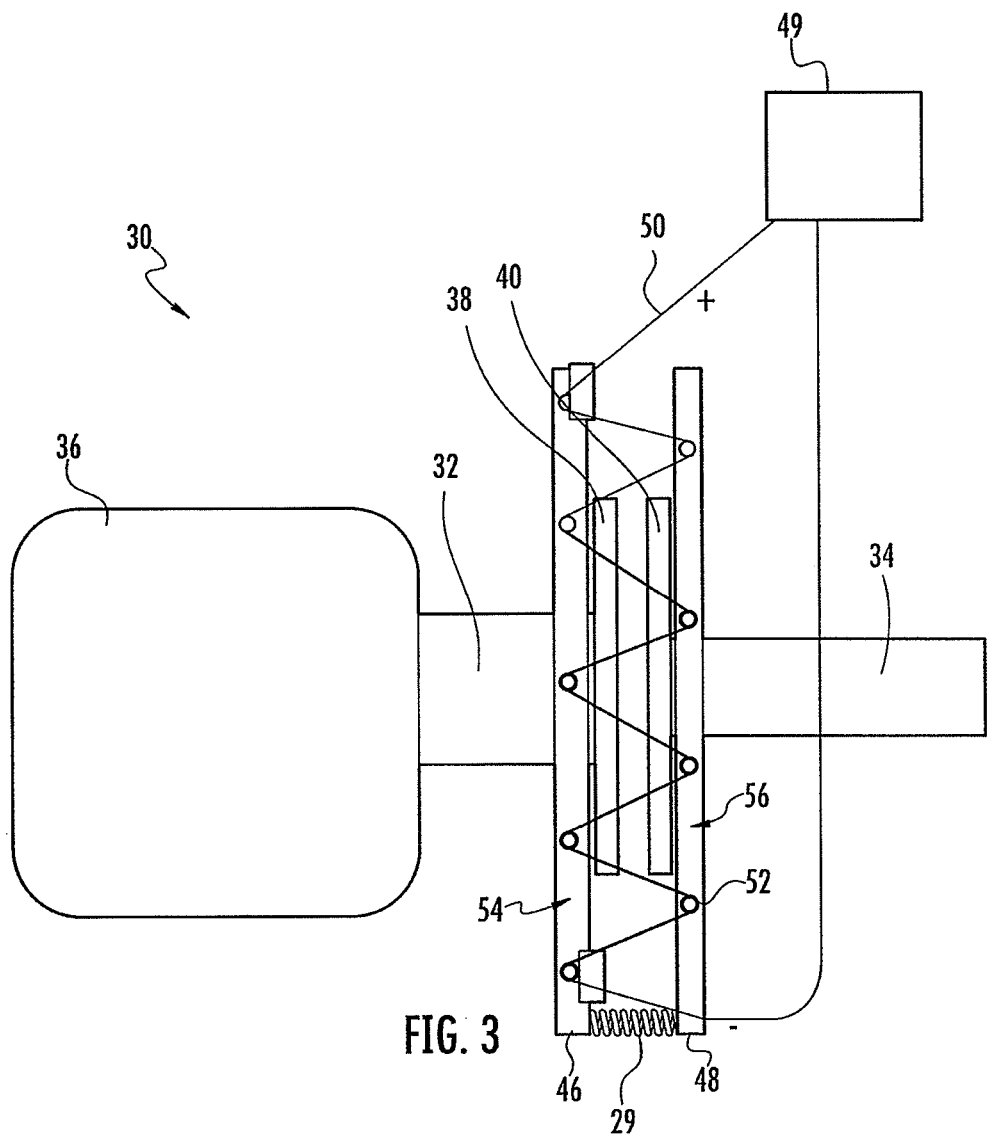
FIG. 3 is a schematic view of a clutch system employing the clamping assembly according to one example embodiment of the present disclosure.

Referring now to FIG. 3 and in another example embodiment, a clutch system 30 is provided and includes first and second rotating shafts 32, 34. The first shaft 32 is attached to and driven by a motor 36 or other power unit (the driving member) while the second shaft 34 (the driven member) provides output power for work to be done. The shafts 32, 34 are configured to be spaced apart at a defined distance in an unlocked (disengaged) position. Each of the first and second shafts 32, 34 are provided with a primary clutch plate 38, 40 at their respective distal end. A clamping assembly is provided and includes non-rotating secondary clutch plates 46, 48 positioned about each shaft 32, 34 and connected to each other via an SMA wire 50. The secondary plates 46, 48 are positioned parallel to and adjacent the primary clutch plates 38, 40 and interface the shafts 32, 34 via bearings (not shown). Further, the secondary clutch plates 46, 48 are connected to each other via the SMA wire 50 which is interwoven through a plurality of pressure amplifiers 52 located on the exterior surfaces 54, 56 of each secondary plate 46, 48. Upon receipt of an electrical current, the SMA wire 50 contracts thereby causing the primary clutch plates 38, 40 to come into contact so that they may be locked together and spin at the same speed (engaged) or locked together but spinning at different speeds (slipping). More specifically, as the SMA wire 50 contracts the secondary clutch plates 46, 48 are pulled together which in turn compresses the primary clutch plates 38, 40 into engagement. In an alternate embodiment, there could be two sets of pressure amplifiers 52 and two SMA wires 50 which may be activated simultaneously.

Advantageously, the use of the clamping assembly increases the overall clamping pressure applied to the clutch system 30. As with the above defined braking system 10, increase clamping pressure is easily provided by simply adding more pressure amplifier 52 and weaving the SMA wire 50 between the secondary clutch plates 46, 48 more. Conversely, decreasing clamping pressure is easily provided by attaching fewer pressure amplifiers 52 and weaves. The clamping pressure amount may also be actively controlled by the amount of electrical current introduced from the firing circuit to the SMA wire 50.

In still another example embodiment, a biasing mechanism or spring 29 may be provided and positioned between the first and second clamping elements 14, 16 of the braking system 10 or between the non-rotating secondary clutch plates 38, 40 of the clutch system 30. Subsequent to a contracting action by the SMA wire 18 or 50, the biasing mechanism 29 may expand as the SMA wire transitions in phase, thereby assisting in the disengagement of the clamping elements 14, 16 or clutch plates 38, 40. It will be understood by those skilled in the art that any conventional biasing mechanism or spring may be employed that is suitable for permanent placement between the clamping elements or secondary clutch plates.

It will be apparent to those skilled in the art that the foregoing disclosure and example embodiments provide novel design methodologies, materials, and paradigms in order to develop miniaturized, lightweight and powerful actuation systems for use with braking and clutch systems. It will also be apparent that the foregoing provides a braking or clutch system which employs a shape memory alloy material as an actuating element for the system. It will also be apparent that the foregoing provides a clamping assembly which employs a shape memory alloy material for actuating a clamping sequence within either a braking system or clutch system.

The embodiments described above provide advantages over conventional devices and associated methods of manufacture. It will be apparent to those skilled in the art that various modifications and variations can be made to the present disclosure without departing from the spirit and scope of the disclosure. Thus, it is intended that the present disclosure cover the modifications and variations of this disclosure provided they come within the scope of the appended claims and their equivalents. Furthermore, the foregoing description of the disclosure and best mode for practicing the disclosure are provided for the purpose of illustration only and not for the purpose of limitation—the disclosure being defined by the claims.

What is claimed is:

1. A clamping assembly, comprising:
   a first clamping element;
   a second clamping element; and
   an actuator wire having a first phase and a second phase, said actuator wire being connectively interwoven through a plurality of pressure amplifiers located on exterior surfaces of said first and second clamping elements, wherein the actuator wire is configured to transition in form from an expanded state in the first phase to a contracted state in the second phase thereby compressing the clamping elements together.

2. The clamping assembly as set forth in claim 1, wherein said actuator wire comprises a shape memory alloy.

3. The clamping assembly as set forth in claim 2, wherein said shape memory alloy comprises Nitinol.

4. The clamping assembly as set forth in claim 2, wherein said second phase is an Austenite phase of said shape memory alloy.

5. The clamping assembly as set forth in claim 2, wherein said first phase is an Martensite phase of said shape memory alloy.

6. The clamping assembly as set forth in claim 2, wherein the shape memory alloy exhibits a contraction of between 4% and 8% between its Martensite and Austenite phases.

7. The clamping assembly as set forth in claim 1, further comprising an activating means for activating a transition action of the actuator wire from said first phase to said second phase.

8. The clamping assembly as set forth in claim 7, wherein the activating means comprises an electrical heating means.

9. The clamping assembly as set forth in claim 2, wherein the clamping assembly is positioned about a rotatable shaft and wherein the compression of the first and second clamping elements together inhibits rotational movement of the shaft.

10. The clamping assembly as set forth in claim 2, wherein the first clamping element is positioned about a first rotating shaft and the second clamping element is positioned about a second rotating shaft and wherein the compression of the clamping elements together causes the first and second rotating shafts to engage.

11. A braking assembly, comprising:
   a rotatable shaft connected to and powered by a motor;
   a first brake pad positioned about the shaft, said first brake pad having a plurality of pressure amplifiers located on an exterior surface thereof;
   a second brake pad positioned about the shaft, said second brake pad having a plurality of pressure amplifiers located on an exterior surface thereof;
   a shape memory alloy actuator wire interwoven between the plurality of pressure amplifiers of the first and the second brake pads, said actuator wire having an expanded state at a low temperature and a contracted state at a high temperature; and
   an electrical heating element connected to the actuator wire operative for heating the actuator wire and causing a phase transition from the expanded state to the contracted state, thereby compressing the first and second brake pads against the shaft.

12. The braking assembly as set forth in claim 11, wherein the shape memory alloy is nitinol.

13. The braking assembly as set forth in claim 11, wherein the shape memory alloy exhibits a contraction of between 4% and 8% between a Martensite phase and a Austenite phase of the shape memory alloy.

14. The braking assembly as set forth in claim 11, further comprising a biasing mechanism located between the first and the second brake pad.

15. The braking assembly as set forth in claim 14, wherein the biasing mechanism is a spring.

16. The braking assembly as set forth in claim 11, wherein the shape memory alloy is CuAlNi.

17. The braking assembly as set forth in claim 11, wherein the shape memory alloy is TiNiPd.

18. A clamping assembly for providing a clamping sequence in either a brake or clutch system, comprising:
   a first clamping element;
   a second clamping element; and
   a shape memory alloy actuator having a first phase and a second phase, said actuator being connectively interwoven through a plurality of pressure amplifiers located on exterior surfaces of said first and second clamping elements, wherein the actuator is configured to transition from the first phase to the second phase thereby compressing the clamping elements together.

19. The clamping assembly as set forth in claim 18, wherein the shape memory alloy actuator is selected from the group consisting of Nitinol, TiNiPd, or CuAlNi.

20. The clamping assembly as set forth in claim 19, wherein the shape memory alloy actuator exhibits a contraction of between 4% and 8% between a Mertensite phase and a Austenite phase of the shape memory alloy.

* * * * *